(12) United States Patent
Homma et al.

(10) Patent No.: US 6,905,462 B1
(45) Date of Patent: Jun. 14, 2005

(54) ENDOSCOPE IMAGE PICKUP OPTICAL SYSTEM

(75) Inventors: Hiroyuki Homma, Hachioji (JP); Sayaka Konno, Hachioji (JP)

(73) Assignee: Olympus Corporation, Tokyo (JP)

( * ) Notice: Subject to any disclaimer, the term of this patent is extended or adjusted under 35 U.S.C. 154(b) by 367 days.

(21) Appl. No.: 10/070,278

(22) PCT Filed: Sep. 6, 2000

(86) PCT No.: PCT/JP00/06037

§ 371 (c)(1),
(2), (4) Date: Sep. 26, 2002

(87) PCT Pub. No.: WO01/18585

PCT Pub. Date: Mar. 15, 2001

(30) Foreign Application Priority Data

Sep. 8, 1999 (JP) .......................................... 11/254448

(51) Int. Cl.$^7$ .......................... A61B 1/05; H04N 5/225; G02B 23/12
(52) U.S. Cl. ........................ 600/176; 600/109; 348/340; 359/363
(58) Field of Search ................................ 600/176, 160, 600/167, 109; 359/363, 753, 798, 809; 348/65, 71, 340, 794

(56) References Cited

U.S. PATENT DOCUMENTS

| | | | | |
|---|---|---|---|---|
| 5,392,067 A | * | 2/1995 | Konno et al. .................. | 348/72 |
| 5,748,512 A | * | 5/1998 | Vargas ......................... | 708/142 |
| 5,933,282 A | * | 8/1999 | Tomioka et al. ............. | 359/685 |
| 6,241,656 B1 | * | 6/2001 | Suga ........................... | 600/109 |
| 6,281,561 B1 | * | 8/2001 | Stiebig et al. ............... | 257/440 |
| 6,493,030 B1 | * | 12/2002 | Kozlowski et al. .......... | 348/310 |
| 6,537,208 B1 | * | 3/2003 | Konno ......................... | 600/167 |
| 6,545,714 B1 | * | 4/2003 | Takada ........................ | 348/340 |

FOREIGN PATENT DOCUMENTS

| | | |
|---|---|---|
| JP | 2-129613 | 5/1990 |
| JP | 5-281492 | 10/1993 |

* cited by examiner

*Primary Examiner*—John P. Leubecker
(74) *Attorney, Agent, or Firm*—Arnold International; Bruce Y. Arnold

(57) ABSTRACT

An endoscope optical system is capable of obtaining favorable endoscopic images at all times by overcoming the conventional disadvantages that diagnosis is hindered by image quality disturbance due to the increase in pixel density resulting from the reduction in pixel pitch of solid-state image pickup devices and also due to the conventional arrangement of an objective front optical element in an optical system having a short focal length or in an optical system having a large F-number. In an image pickup apparatus using a monochromatic high-density solid-state image pickup device in which the average pixel pitch (H+V)/2 of the pixel pitch H in the horizontal direction and the pixel pitch V in the vertical direction with respect to the monitor scanning line is not more than 4.65 μm, or using an interline type color high-density solid-state image pickup device in which the average pixel pitch (H+V)/2 is not more than 3.1 μm, the volume $V_1$ of an air layer between a plane-parallel plate (F1) closest to the object side in the image pickup optical system and a piano-concave negative lens (L1) satisfies the following condition:

$$V_1 < 4 \text{ mm}^3 \tag{1}$$

22 Claims, 11 Drawing Sheets

FIG. 17
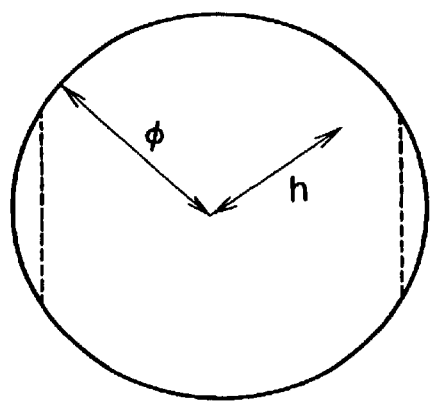
(a)
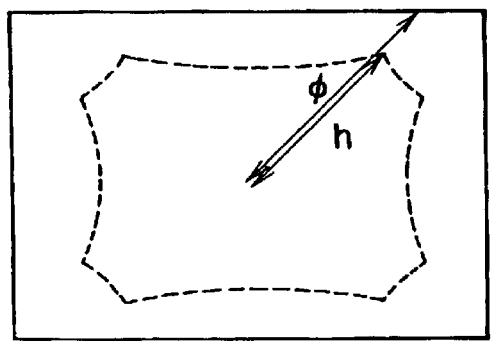
(b)
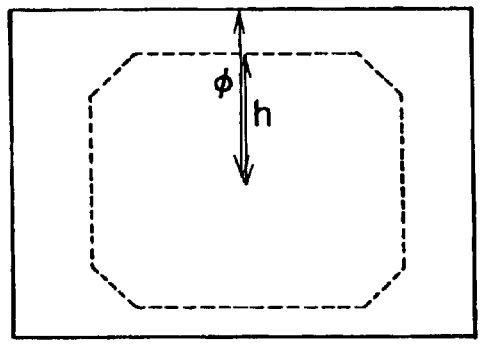
(c)

ENDOSCOPE IMAGE PICKUP OPTICAL SYSTEM

TECHNICAL FIELD

The present invention relates to an endoscope image pickup optical system for forming an image on an electronic image pickup device. More particularly, the present invention relates to an electronic image pickup optical system providing a favorable image free from image quality disturbance in electronic cameras and endoscopes using a high-density solid-state image pickup device.

BACKGROUND ART

As a means for examining and treating the inside of a body cavity or the like by inserting an insert part into the body cavity or the like, a video endoscope is widely used, which has a solid-state image pickup device (hereinafter referred to as "CCD") incorporated in a distal end portion thereof.

There are two image pickup systems available to video endoscopes using a single CCD.

One of them is a field sequential image pickup system in which R, G and B light are sequentially applied to a subject, and reflected light from the subject is imaged by using a monochromatic CCD.

The other is a simultaneous image pickup system in which imaging is carried out by using a color CCD employing a primary or complementary color filter.

Regarding a subject having white and black rectangular-wave patterns in the horizontal direction, the number of pixels required to make a distinction between a pair of white and black patterns is considered in general as follows.

When a monochromatic CCD is used, the minimum number of pixels required is two.

When a color CCD employing an interline type complementary color filter, which is employed in many video endoscopes, is used, the minimum number of pixels required is three.

For the reasons stated above, 1 pixel in the monochromatic CCD and 1.5 pixels in the color CCD may be regarded as the smallest unit necessary for producing one smallest image in the horizontal direction (hereinafter referred to as "smallest unit pixel" for producing one image in the horizontal direction of the CCD).

Recently, with the reduction in pixel pitch of CCDs, the pixel density has become higher, and endoscopes of high image quality have been realized which are capable of observing even very small portions that have heretofore been impossible to see with conventional CCDs having a pixel pitch of 8 $\mu$m or more. On the other hand, diagnosis may be hindered by a scratch or chip on an image pickup optical element or foreign matter attached thereto that are so small as not to interfere with diagnosis in the past because of the high-resolution image quality.

Further, if the focal length decreases or the F-number increases in an endoscope image pickup optical system without an increase in size of the optical system, the light beam incident on the smallest unit pixel for producing one image in the horizontal direction of the CCD becomes smaller in diameter than in the past. Consequently, diagnosis may be hindered by a scratch or chip or foreign matter on an objective optical element that have heretofore presented no problem.

Among the causes of disturbing image quality arising from the presence of the above-described scratch or chip or foreign matter on the image pickup optical element, three causes due to the optical element closest to the object side in the image pickup optical system are frequently regarded as problematic.

Cause 1 is the degradation of image quality due to fogging of the image-side surface of the optical element closest to the object side in the image pickup optical system. When an endoscope is inserted into a body cavity, the contents of the body cavity or the mucus may be attached to the surface of the optical element closest to the object side in the endoscope image pickup optical system (the optical element surface will hereinafter be referred to as "viewing window"), disturbing the distinct vision. The foreign substances attached to the viewing window are washed off with washing water sent from a nozzle for washing provided on the distal end of the endoscope. However, because the washing water is lower in temperature than the viewing window, which has been heated by the body temperature, condensation occurs on the image-side surface of the optical element closest to the object side in the image pickup optical system. Fogging of the optical element makes it impossible to obtain a favorable image. Japanese Patent Application Unexamined Publication (KOKAI) No. Hei 5-281492 mentions a means for preventing fogging, as shown in FIG. 12, by air-tightly sealing the joint 3 between an optical element 1 closest to the object side in an image pickup optical system and an optical element 2 next closest to the object side to prevent water vapor from entering an air layer between the optical element 1, which is the closest to the object side, and the optical element 2, which is the next closest to the object side, thereby preventing occurrence of fogging. However, if the front and second optical elements are cemented together to attain an airtight seal, the adhesive may enter the inside of a bundle of rays (hereinafter referred to as "within the visual field") incident on the CCD by capillary action, causing flare, which gives rise to a problem. Hitherto, when such problems occur, the image pickup optical system and the image pickup unit are repaired by taking them out. Therefore, it costs a great deal to make repairs.

Cause 2 is the degradation of image quality due to the adhesion of water to the object-side surface of the viewing window. An endoscope is, as shown in FIG. 13, equipped with an objective optical system 6, an illuminating optical system 7, and a nozzle 5. Filth attached to the object-side surface of the viewing window is washed off with washing water from the nozzle 5, and the washing water is blown off by air sent from the nozzle 5. However, the adhesive applied to the periphery of the optical element closest to the object side in the image pickup optical system interferes with the blowing off of washing water and foreign matter by air. Consequently, all the washing water and so forth cannot flow away, but drops of water remain on the periphery of the viewing window and disturb the distinct vision (this will hereinafter be referred to as "poor drainability"). To improve the poor drainability, the viewing window may be covered with a water-repellent coating as in Japanese Patent Application Unexamined Publication (KOKAI) No. Hei 2-129613. However, endoscopes for medical treatment have to undergo severe use environments such as disinfection and sterilization. Therefore, such a water-repellent coating is very likely to separate from the lens and hence cannot be used continuously. Further, in these days of CCDs with a decreasing pixel pitch, the light beam incident on the smallest unit pixel for producing one image in the horizontal direction of a CCD is smaller in diameter than in the past. Accordingly, foreign matter attached to the object-side surface of the viewing window is conspicuous. Under these circumstances, because the light beam becomes thinner at the peripheral portion of the viewing window, which exhibits a strong tendency to disturb the distinct vision owing to the poor drainability, diagnosis may also be hindered by small drops of water remaining on the periphery of the object-side surface of the viewing window, which have heretofore presented no problem.

Cause 3 is the degradation of image quality due to a scratch or chip on the object-side surface of the viewing window. When an endoscope is carried in a hospital or the like, the viewing window may be scratched or chipped if the endoscope is bumped against something by mistake. A small scratch or chip that gives rise to no problem in diagnosis when the light beam incident on the smallest unit pixel for producing one image in the horizontal direction of the CCD corresponds to the order of a pixel pitch of 8 μm or more as in the past is conspicuous and hinders diagnosis because the image is of high resolution.

Such a small scratch or chip is more conspicuous for the reasons stated above when the focal length is 2.2 mm or less or the F-number is 3.5 or more in a small optical system such as an endoscope image pickup optical system.

DISCLOSURE OF THE INVENTION

An object of the present invention is to provide an endoscope capable of obtaining favorable endoscopic images at all times by overcoming the disadvantages of the prior art that diagnosis is hindered by image quality disturbance due to the increase in pixel density resulting from the reduction in pixel pitch of solid-state image pickup devices and also due to the conventional arrangement of an image pickup front optical element in an optical system having a short focal length or in an optical system having a large F-number. A video endoscope that is inserted into a body cavity to make a medical examination or to perform a treatment needs to attain such high image quality that an abnormal part and so forth can be surely imaged.

A first endoscope image pickup optical system according to the present invention is applicable to an image pickup apparatus using a monochromatic high-density solid-state image pickup device in which the average pixel pitch (H+V)/2 of the pixel pitch H in the horizontal direction and the pixel pitch V in the vertical direction with respect to the monitor scanning line is not more than 4.65 μm, or using a color high-density solid-state image pickup device in which the average pixel pitch (H+V)/2 is not more than 3.1 μm.

The first endoscope image pickup optical system is characterized in that the volume $V_1$ of an air layer between an optical element closest to the object side in the image pickup optical system and a second optical element immediately subsequent to the optical element toward the image side satisfies the following condition:

$$V_1 < 4 \text{ mm}^3 \tag{1}$$

The function of the first arrangement will be described. If the volume $V_1$ of the air layer lying between the optical element closest to the object side in the image pickup optical system and the second optical element next closest to the object side is large, moisture in the air layer condenses on the image-side surface of the optical element closest to the object side in the image pickup optical system. In a high-resolution image in which the smallest unit pixel for producing one image in the horizontal direction of a CCD is not more than 4.65 μm in terms of the size of one pixel of a monochromatic CCD or not more than 3.1 μm in terms of the size of one pixel in a color CCD, even very small drops of water formed by condensation interfere with diagnosis. Therefore, if the volume of the air layer lying between the optical element closest to the object side and the second optical element next closest to the object side is reduced to less than 4 mm³ as in the first arrangement of the present invention, condensation can be minimized effectively.

It is preferable to reduce the air layer volume to less than 3 mm³ and further to less than 2 mm³ or 1 mm³. Further, it is desirable that the distance d along an optical axis from the image-side surface of the optical element closest to the object side in the image pickup optical system to the object-side surface of the second optical element immediately subsequent to the optical element toward the image side should satisfy the following condition:

$$d < 1 \text{ mm} \tag{2}$$

When the optical element closest to the object side in the image pickup optical system is a (negative) lens having a concave surface directed toward the image side or a plano-concave lens cemented to a plane-parallel plate, it is desirable that the volume $V_2$ of an approximately spherically cut portion (hereinafter referred to as "spherical segment volume") on the concave surface side of the lens should satisfy the following condition:

$$V_2 < 1.5 \text{ mm}^3 \tag{3}$$

The reason for the above is as follows. It is preferable that the volume of the air layer should be minimized as in the case of the above. In addition, if the front optical element is formed from a (negative) concave lens having a concave surface directed toward the image side or a plano-concave lens cemented to a cover glass of plane-parallel plate, it is easy to obtain a wide field angle appropriate for an image pickup optical system of an endoscope. At the same time, even when the distance d is reduced to minimize the volume of the air layer as expressed by the condition (2), if the condition (3) is satisfied, the spherical segment volume can be reduced while minimizing the outer diameter of the endoscope front optical element, and it is easy to obtain a wide field angle. If $V_2$ is reduced to 1 mm³ or the distance d is reduced to 0.7 mm or 0.5 mm, the air layer further decreases in size, which is effective in preventing fogging.

It is preferable that the foremost optical element should be a negative lens having, in order from the object side, a plane surface and a concave surface directed toward the image side.

The reason for the above is as follows. If the object-side surface of the foremost optical element is plane surface, it is flush with the distal end surface of the endoscope. Accordingly, the object-side surface of the foremost optical element has a structure that is unlikely to be scratched and on which water or the like is unlikely to remain.

The above-described arrangement is even more effective when the focal length of the image pickup optical system is not more than 2.2 mm. The reason for this is as follows. If a compact optical system such as an endoscope image pickup optical system has a short focal length, the light beam incident on the smallest unit pixel for producing one image in the horizontal direction of a CCD becomes small in diameter. Therefore, the resulting structure is readily affected by fogging.

Further, the above-described arrangement is even more effective when the F-number of the image pickup optical system is not less than 3.5. That is, it is desirable that the endoscope image pickup optical system should have a large F-number with a view to ensuring an increased depth of field for the optical system. However, as the F-number increases, the diameter of the light beam incident on the smallest unit pixel for producing one image in the horizontal direction of a CCD becomes smaller. Therefore, the resulting structure is readily affected by fogging.

A second endoscope image pickup optical system according to the present invention is applicable to an image pickup apparatus using a monochromatic high-density solid-state image pickup device in which the average pixel pitch (H+V)/2 of the pixel pitch H in the horizontal direction and the pixel pitch V in the vertical direction with respect to the monitor scanning line is not more than 4.65 μm, or using a color high-density solid-state image pickup device in which the average pixel pitch (H+V)/2 is not more than 3.1 μm, The second endoscope image pickup optical system is characterized in that when the length from the center of the viewing window to the edge thereof on the object-side surface of an optical element closest to the object side in the image pickup optical system is denoted by φ and the maximum ray height of rays within the visual field on the object-side surface of the optical element from the optical axis of an objective optical system is denoted by h, the margin Y (=φ−h) for the length to the edge of the viewing window with respect to the ray height satisfies the following conditions:

$$1.0 \text{ mm} < \phi < 3.5 \text{ mm} \quad (4)$$

$$0.12 \text{ mm} < Y < 0.6 \text{ mm} \quad (5)$$

Let us explain the function of the second arrangement. When drops of water or the like are on the object-side surface of the viewing window, even if air is sent from the nozzle, the water drops on the object-side surface of the viewing window may remain on the peripheral portion of the viewing window, i.e. on the peripheral portion of the output image, without being satisfactorily blown off because the adhesive between the viewing window and the frame is somewhat uneven. In such a case, the water drops are seen at the peripheral portion of the output image, which may hinder diagnosis.

When tiny water drops or the like remain on the periphery of the object-side surface of the viewing window owing to poor drainability as stated above, the water drops are more conspicuous than in the conventionally employed CCDs and hence hinder diagnosis in the case of a high-resolution mage in which the smallest unit pixel for producing one image in the horizontal direction of a CCD is not more than 4.65 μm in terms of the size of one pixel of a monochromatic CCD and not more than 3.1 μm in terms of the size of one pixel in a color CCD.

Therefore, the length of -he object-side surface of the optical element closest to the object side in the image pickup optical system from the center of the viewing window to the edge thereof is increased as expressed by the condition (4), and the maximum ray height within the visual field on the viewing window is lowered to leave the margin Y between the maximum ray height h within the visual field on the viewing window and the edge of the optical element as expressed by the condition (5). Thus, even if water adheres to the area between the adhesive and the optical element edge, water drops are unlikely to remain within the visual field. Hence, it is possible to obtain a structure in which rays will not be eclipsed by water.

Here, φ and h are defined as follows.

When the optical element closest to the object side in the image pickup optical system is circular as seen from the object side, the length from the center of the viewing window to the edge thereof on the object-side surface of the optical element closest to the object side in the image pickup optical system, i.e. the radius, is defined as φ, and the maximum ray height of a ray forming an image at the maximum image height among the rays within the visual field is defined as h. Consequently, the margin for the length to the edge of the viewing window with respect to the ray height is given by Y=φ−h.

Next, when the optical element closest to the object side in the image pickup optical system has a shape obtained by cutting a peripheral portion of an optical element that is circular as seen from the object side by a straight line at one or a plurality of positions, the length φ and the maximum ray height h are defined in the same way as the above (FIG. 17(a)).

When the optical element closest to the object side in the image pickup optical system is quadrangular as seen from the object side or has a polygonal shape as obtained by chamfering the corners of the quadrangular optical element, it is necessary to choose between the following two ideas.

On the object-side surface of the viewing window, the maximum ray height of a ray forming an image at the highest position in image height in the long-side direction of the viewing window is defined as h, and the distance from the optical axis to the viewing window edge in the same direction as the direction in which h is defined is defined as φ (FIG. 17(b)).

Alternatively, the shortest distance from the optical axis to the viewing window edge in the viewing window is defined as φ, and the maximum ray within the visual field in the same direction as the direction in which φ is defined is defined as h (FIG. 17(c)).

In this case, the margin Y=φ−h for the length to the edge of the viewing window with respect to the ray height uses the values of φ and h with which the margin Y becomes smaller.

The above-described arrangement is even more effective when the focal length of the image pickup optical system is not more than 2.2 mm. The reason for this is as follows. If a compact optical system such as an endoscope image pickup optical system has a short focal length, the light beam incident on the smallest unit pixel for producing one image in the horizontal direction of a CCD becomes small in diameter. Therefore, the resulting structure is readily affected by drainability.

Further, the above-described arrangement is even more effective when the F-number of the image pickup optical system is not less than 3.5. That is, it is desirable that the endoscope image pickup optical system should have a large F-number with a view to ensuring an increased depth of field for the optical system. However, as the F-number increases, the diameter of the light beam incident on the smallest unit pixel for producing one image in the horizontal direction of a CCD becomes smaller. Therefore, the resulting structure is readily affected by drainability.

A third endosccpe image pickup optical system according to the present invention is applicable to an image pickup apparatus using a monochromatic high-density solid-state image pickup device in which the average pixel pitch (H+V)/2 of the pixel pitch H in the horizontal direction and the pixel pitch V in the vertical direction with respect to the monitor scanning line is not more than 4.65 μm, or using a color high-density solid-state image pickup device in which the average pixel pitch (H+V)/2 is not more than 3.1 μm, The third endoscope image pickup optical system is characterized in that an optical element closest to the object side in the image pickup optical system uses a material having a Knoop hardness of not less than 800.

It should be noted that "Knoop hardness" is a quantity calculated from the following equation when a flat polished surface of a sample is indented by pressing a diamond rhombic indenter (dihedral angles: 172°30' and 130°) against the flat polished surface for 15 seconds under a load of 0.98 N{0.1 kgf}.

Knoop hardness=1.451 $F/l^2$ where: F: the load (N)
l: the length (mm) of the longer diagonal line Let us explain the function of the third arrangement. A material with a Knoop hardness of not less than 800 used to form the optical element closest to the object side in the image pickup optical system is harder than the conventionally used optical glass. Therefore, the optical element closest to the object side in the image pickup optical system will not be scratched or chipped by such an impact as given when it is bumped against something by mistake. Accordingly, the problem that even a very small scratch or chip is undesirably imaged to hinder diagnosis or the like because of a high-resolution image with a small pixel pitch can be solved by preventing occurrence of a scratch or chip. The advantageous effect becomes even more remarkable as the size of the smallest unit pixel for producing one image in the horizontal direction of a CCD decreases to 4 μm and further to 3 μm in terms of the pixel pitch of a monochromatic CCD or to 2 μm in terms of the pixel pitch of a color CCD.

In the present invention, it is preferable to use the above-described optical element as the optical element closest to the object side in the image pickup optical system when the focal length of the image pickup optical system is not more than 2.2 mm. The reason for this is as follows. An optical system having appropriate specifications for use as an image pickup objective optical system for an endoscope, for example, tends to become shorter in focal length as the pixel pitch decreases and hence the optical element becomes smaller in size. Consequently, the light beam incident on the smallest unit for producing an image in the solid-state image pickup device becomes smaller in diameter. The light beam becomes particularly smaller in diameter at the optical element closest to the object side, which is away from the aperture stop. Accordingly, the above-described arrangement is particularly effective in an optical system having a short focal length. The advantageous effect of the optical system using the above-described element becomes even more remarkable as the focal length shortens to 2 mm, 1.5 mm, 1 mrm and further to 0.7 mm.

In the present invention, it is preferable to use the above-described optical element as the optical element closest to the object side in the image pickup optical system when the F-number is not less than 3.5. In an optical system having a large F-number, the light beam is small in diameter. Therefore, a scratch or chip is conspicuous as in the case of the above. Therefore, the above-described arrangement is effective in such an optical system.

Further, it is preferable in the present invention that the optical element closest to the object side in the image pickup optical system should be a negative lens having, in order from the object side, a plane surface and a concave surface directed toward the image side. In general, an endoscope comprises a wide-angle optical system providing a field angle of 100° or more. Therefore, if the optical element closest to the object side in the image pickup optical system is a plane-parallel plate, as shown in FIG. 11(b), the area 8 within the visual field defined on the viewing window by a bundle of rays incident on an effective image pickup area 10 (i.e. effective image area) of a solid-state image pickup device 9 becomes large. Consequently, the front optical element increases in outer diameter, resulting in an increase in outer diameter of the distal end portion of the endoscope. Therefore, if the front optical element is formed from a plano-concave lens as shown in FIG. 11(a), the area defined by the rays within the visual field is reduced. Accordingly, it becomes possible to reduce the outer diameter of the endoscope.

In the present invention, further, it is preferable that the material of the image pickup front optical element should be sapphire. If sapphire glass is used, the Knoop hardness is extremely high, i.e. 1370. Accordingly, the front optical element is scratchable by only several kinds of material, e.g. diamond. Therefore, the arrangement becomes even more effective.

BRIEF DESCRIPTION OF THE DRAWINGS

FIG. 17 is a diagram for describing the definition of φ and h.

BEST MODE FOR CARRYING OUT THE INVENTION

Examples of the image pickup optical system according to the present invention will be described below.

EXAMPLE 1

Figure 1:
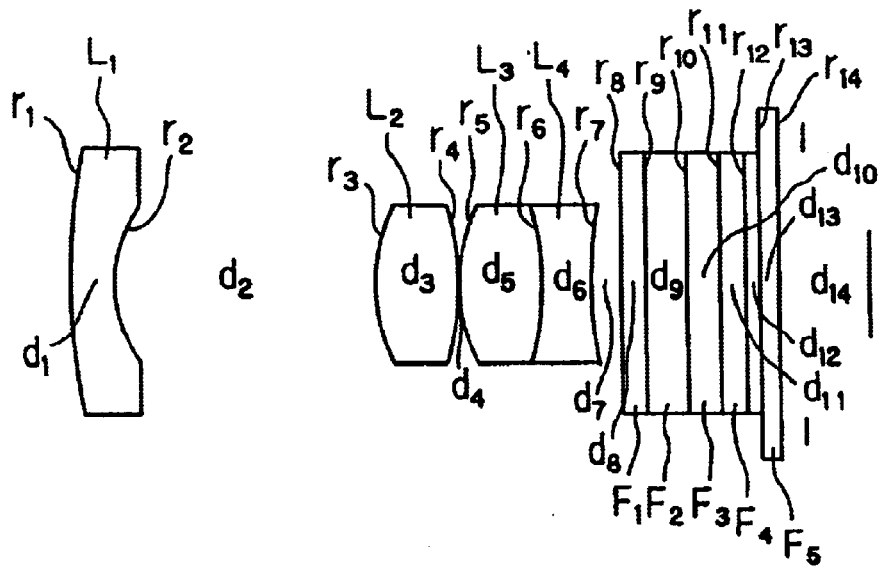
FIG. 1 is a sectional view of a lens system constituting an optical system of an electronic camera according to Example 1.
Figure 2:
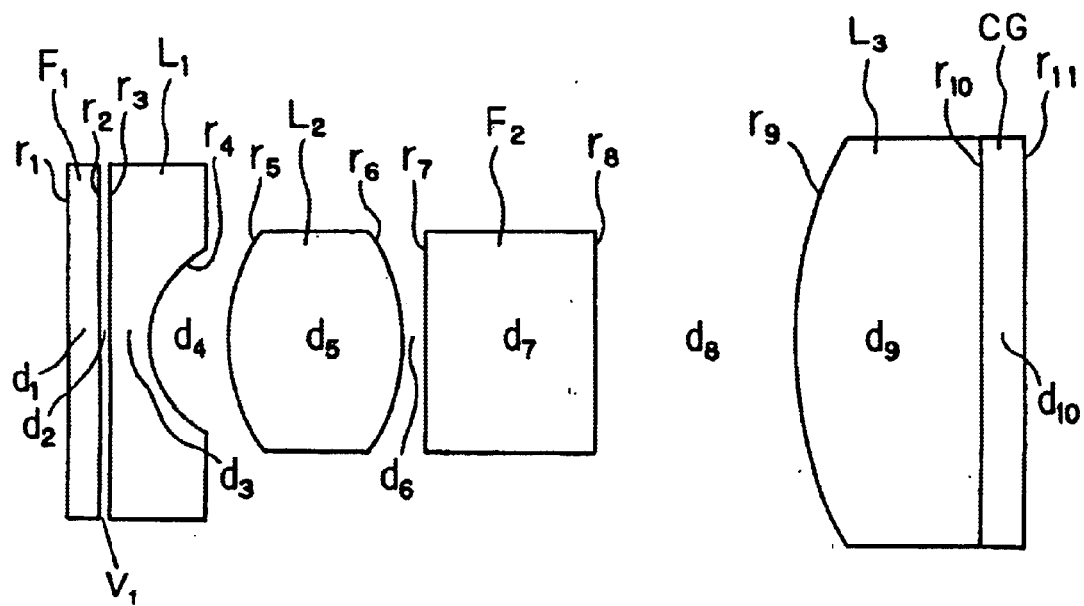
FIG. 2 is a sectional view of a lens system constituting an endoscope optical system according to Example 2.

FIG. 1 shows a sectional view of a lens system constituting an optical system of an electronic camera according to Example 1. Example 1 has lens data as shown in Table 1, which will be shown later. In the table: f denotes the focal length of the entire system; 2ω denotes the field angle; FNo denotes the F-number; $r_1, r_2 \ldots$ denote the radii of curvature of lenses; $d_1, d_2 \ldots$ denote the spacings between lens surfaces and the lens spacings; $n_{d1}, n_{d2} \ldots$ denote the refractive indices of the lenses for the d-line (587 nm); and $v_{d1}, v_{d2} \ldots$ denote the Abbe's numbers of the lenses for the d-line (587 nm). The same shall apply hereinafter.

Example 1 comprises, in order from the object side, a negative meniscus lens L1 having a convex surface directed toward the object side, a double-convex positive lens L2, a cemented lens consisting of a double-convex positive lens L3 and a double-concave negative lens L4, plane-parallel plates F1 to F5, and a CCD. It should be noted that the plane-parallel plates F1 to F4 are cemented together with an optical cement. The CCD in this image pickup optical system is a high-density CCD with an average pixel pitch of 4.5 μm using an interline type primary color filter.

The focal length of this image pickup optical system is 7.316 mm, and the F-number thereof is 5. The lens L1 closest to the object side in this objective optical system is made of synthetic sapphire having a Knoop hardness of 1370. Thus, the optical system has a structure in which the objective window will not be scratched or chipped upon application of a strong impact. Accordingly, there is no possibility of the image being disturbed by a scratch or chip.

EXAMPLE 2

FIG. 1 shows a sectional view of a lens system constituting an endoscope optical system according to Example 2. Example 2 has lens data as shown in Table 2, which will be shown later.

Example 2 comprises, in order from the object side, a plane-parallel plate glass or optical filter F1, a plano-concave negative lens L1, a double-convex positive lens L2, a filter F2 of plane-parallel plate for preventing infrared rays from entering the CCD, a convexo-plane positive lens L3, and a cover glass CG for the CCD. Among the optical elements, the optical filter F1 and the plano-concave negative lens L1 are quadrangular optical elements so as to be conformable to the shape of the effective image pickup-area of the CCD and to minimize the size of the image pickup optical system. It should be noted that the image-side plane surface of the convexo-plane plane positive lens L3 and the CCD cover glass CG are cemented together with an optical cement.

The CCD used in this image pickup optical system is a monochromatic CCD, which is a high-density CCD with an average pixel pitch of 4.6 μm.

The focal length of this image pickup optical system is 1.8 mm, and the F-number thereof is 6.8. The area on the viewing window of a light beam forming an image at a point of the maximum image height among the rays within the visual field is very small, i.e. 0.056 mm².

However, the optical element F1 of plane-parallel plate, which is the closest to the object side in the image pickup optical system, is made of glass containing $ZrO_2$ ($SiO_2$: 43.48%; $ZrO_2$: 56.52%) and having a Knoop hardness of 936, thus providing a structure in which the viewing window will not be scratched or chipped upon application of a strong impact. Therefore, there is no possibility of the image being disturbed by a scratch or chip.

The volume of an air layer enclosed by a lens frame between the plane-parallel plate F1 and the plano-concave negative lens L1 is 0.7065 mm³. Reducing the size of the air layer makes it possible to prevent fogging of the image-side surface of the optical element closest to the object side in the image pickup optical system. If the whole optical system is reduced in size, it becomes easy to reduce the air layer volume to 0.5 mm³ or less. By doing so, fogging can be prevented even more effectively.

At the viewing window of the image pickup optical system, the maximum ray height h of the rays within the visual field from the optical axis is 1.25 mm. The length φ from the optical axis to the viewing window edge in the direction of the maximum ray height is 1.45 mm. Thus, the margin Y between the maximum ray height within the visual field and the edge of the viewing window is 0.2 mm. Therefore, the optical system has a structure free from image disturbance due to poor drainability.

Figure 3:
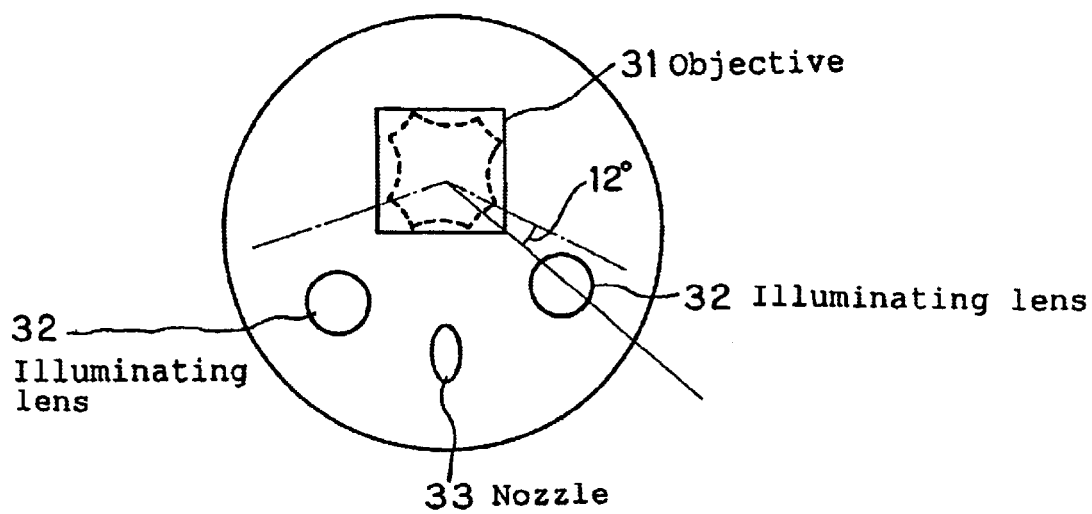
FIG. 3 is a diagram showing the layout of the distal end of an endoscope according to Example 1.
Figure 13:
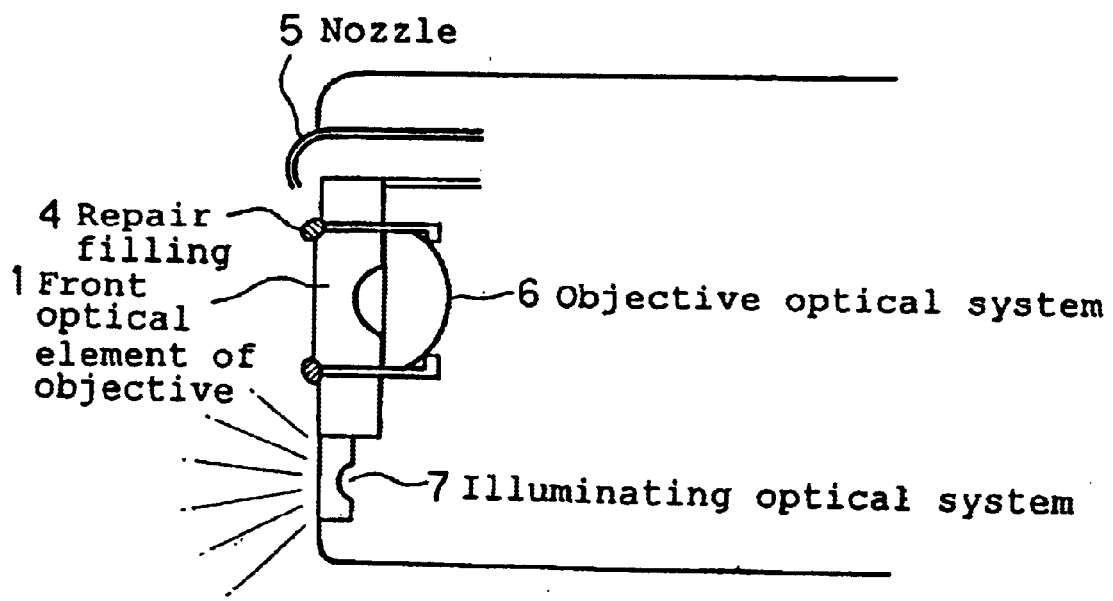
FIG. 13 is a diagram for describing another problem associated with a conventional endoscope objective optical system.

FIG. 3 shows the layout of the distal end of an endoscope equipped with the image pickup optical system. As illustrated in the figure, the endoscope distal end has a viewing window (objective) 31, illuminating windows (illuminating lenses) 32, a nozzle 33 for washing and a forceps opening (not shown), which are disposed at appropriate positions so that observation and treatment can be performed easily. The dotted line inside the viewing window 31 indicates that rays inside the dotted line are those within the visual field, and these rays are incident on the effective image pickup area of the CCD. A monitor image entering through the viewing window 31 is as shown in FIG. 13. As shown in FIG. 3, the illuminating windows 32 are located at respective positions on the extensions from a pair of chamfered opposite sides at the four corners of the monitor image. The center of each illuminating window 32 is disposed at a position of 12° about the center of the monitor output image with respect to a straight line connecting the center of the monitor output image and a point at which the length from the center of the monitor output image to the edge of the output image is the longest.

Further, a black adhesive is applied to fill in a portion where a line segment connecting the center of the viewing window 31 and the center of each illuminating window 32 intersects the outer periphery of the viewing window 31, over a range of ±1 mm.

EXAMPLE 3

Figure 4:
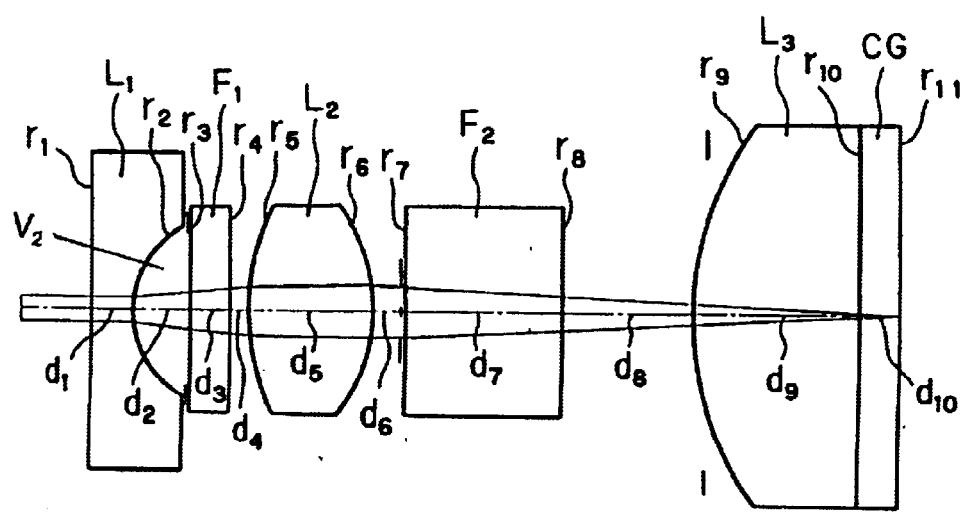
FIG. 4 is a sectional view of a lens system constituting an endoscope optical system according to Example 3.

FIG. 4 shows a sectional view of a lens system constituting an endoscope optical system according to Example 3. Example 3 has lens data as shown in Table 3, which will be shown later.

Example 3 comprises, in order from the object side, a plano-concave negative lens L1, a plane-parallel plate F1, a double-concave positive lens L2, a filter F2 of plane-parallel plate for preventing infrared rays from entering the CCD, a convexo-plane positive lens L3, and a cover glass CG for the CCD. It should be noted that the image-side plane surface of the convexo-plane positive lens L3 and the CCD cover glass CG are cemented together with an optical cement.

The CCD in this image pickup optical system is a color CCD employing an interline type complementary color filter, which is a high-density CCD with an average pixel pitch of 2.8 μm.

The focal length of this image pickup optical system is 1.539 mm, and the F-number thereof is 5.6. The area of a light beam forming an image at a point of the maximum image height among the rays within the visual field is as small as 0.077 mm².

The plano-concave negative lens L1, which is the closest to the object side, is made of sapphire having a Knoop hardness of 1380 and hence has a structure that is not readily scratchable. The volume of an air layer between the lens L1, which is the closest to the object side, and the plane-parallel plate F1 is 1 mm³. Thus, the system has an antifogging structure.

The spherical segment volume $V_2$ is 0.78 mm³. The distance d along the optical axis from the image side of he optical element L1, which is the closest to the object side, to the object-side surface of the second optical element F1, which is immediately subsequent to the optical element L1 toward the image side, is 0.6 mm.

At the viewing window of the image pickup optical system, the maximum ray height of the rays within the visual field from the optical axis is 1.21 mm. The length φ from the center of the viewing window to the viewing window edge in the direction of the maximum ray height is 1.34 mm. Thus, the margin Y between the maximum ray height within the visual field and the edge of the viewing window is 0.13 mm. Therefore, the optical system has a structure free from image disturbance due to poor drainability.

Figure 5:
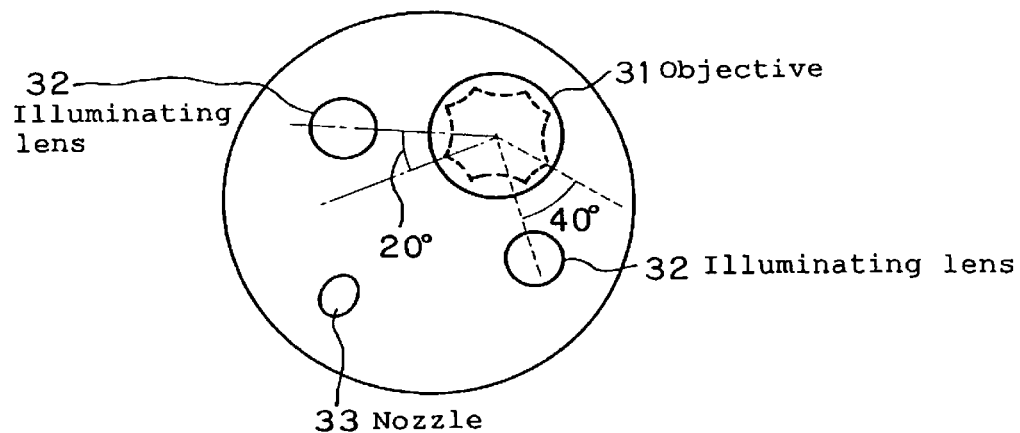
FIG. 5 is a diagram showing the layout of the distal end of an endoscope according to Example 3.

FIG. 5 shows the layout of the distal end of an endoscope equipped with the image pickup optical system. In the figure, the dotted line inside a viewing window 31 indicates that rays inside the dotted line are those within the visual field, and these rays are incident on the effective image pickup area of the CCD, as in the case of Example 2. A monitor image entering through the viewing window 31 is as shown in FIG. 13. Thus, illuminating windows are disposed at respective positions on the extensions from opposite sides of the monitor image. The center of one illuminating window (illuminating lens) 32 is disposed at a position of 20° about the center of the monitor output image with respect to a straight line connecting the center of the monitor output image and a point at which the length from the center of the monitor output image to the edge of the output image is the longest. Similarly, the center of the other illuminating window (illuminating lens) 32 is disposed at a position of 40° about the center of the monitor output image with respect to a straight line connecting the center of the monitor output image and a point at which the length from the center of the monitor output image to the edge of the output image is the longest.

Further, a black adhesive is applied to fill in a portion where a line segment connecting the center of the viewing window 31 and the center of each illuminating window 32 intersects the outer periphery of the viewing window 31, over a range of ±0.7 mm.

EXAMPLE 4

Figure 6:
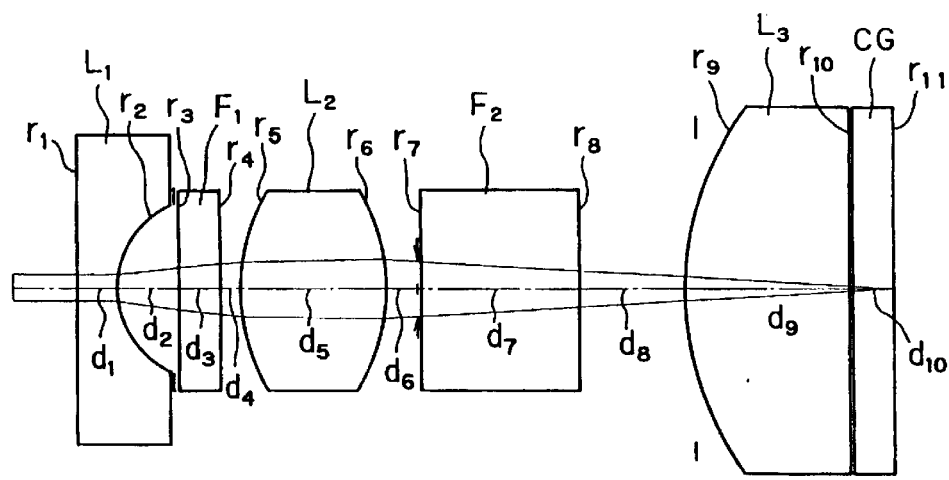
FIG. 6 is a sectional view of a lens system constituting an endoscope optical system according to Example 4.

FIG. 6 shows a sectional view of a lens system constituting an endoscope optical system according to Example 4. Example 4 has lens data as shown in Table 4, which will be shown later.

Example 4 comprises, in order from the object side, a plano-concave negative lens L1, a plane-parallel plate F1, a double-convex positive lens L2, a filter F2 of plane-parallel plate for preventing infrared rays from entering the CCD, a convexo-plane positive lens L3, and a cover glass CG for the CCD. It should be noted that the image-side plane surface of the convexo-plane positive lens L3 and the CCD cover glass CG are cemented together with an optical cement.

The CCD used in this image pickup optical system is a color CCD employing an interline type complementary color filter, which is a high-density CCD with an average pixel pitch of 2.5 μm.

The focal length of this image pickup optical system is 0.6629 mm, and the F-number thereof is 4.6. The area of a light beam forming an image at a point of the maximum image height among the rays within the visual field is as small as 0.02 mm². Because the plano-concave lens L1, which is the closest to the object side, is made of sapphire having a Knoop hardness of 1380, a structure that is not readily scratchable is obtained. The volume of an air layer between the lens L1, which is the closest to the object side, and the plane-parallel plate F1 is 0.1 mm³. Thus, the system has an antifogging structure.

The spherical segment volume $V_2$ is 0.08 mm³. The distance d along the optical axis from the image side of the optical element L1, which is the closest to the object side, to the object-side surface of the second optical element F1, which is immediately subsequent to the optical element L1 toward the image side, is 0.284 mm.

At the viewing window of the image pickup optical system, the maximum ray height h of the rays within the visual field from the optical axis is 0.69 mm. The length φ from the center of the viewing window to the viewing window edge in the direction of the maximum ray height is 0.84 mm. Thus, the margin Y between the maximum ray height within the visual field and the edge of the viewing window is 0.15 mm. Therefore, the optical system has a structure free from image disturbance due to poor drainability.

EXAMPLE 5

Figure 7:
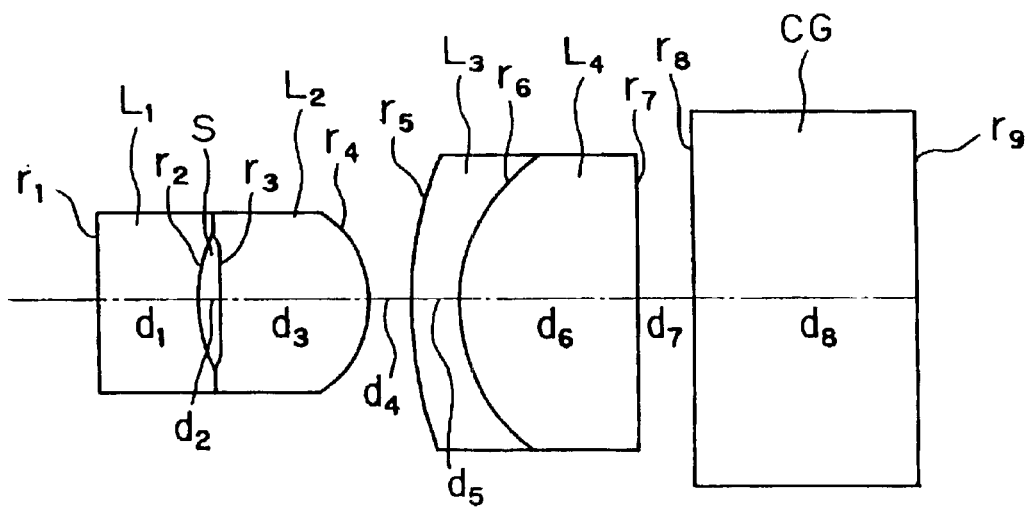
FIG. 7 is a sectional view of a lens system constituting an image pickup optical system according to Example 5.

FIG. 7 shows a sectional view of a lens system constituting an image pickup optical system according to Example 5. Example 5 has lens data as shown in Table 5, which will be shown later.

Example 5 comprises, in order from the object side, a plano-concave negative lens L1, an aperture stop S, a positive meniscus lens L2 having a concave surface directed toward the object side, a cemented lens consisting of a negative meniscus lens L3 having a convex surface directed toward the object side and a convexo-plane positive lens L4, and a cover glass CG for the CCD. The CCD used in this image pickup optical system is a color CCD employing an interline type complementary color filter, which is a high-density CCD with an average pixel pitch of 3 μm.

The focal length of this image pickup optical system is 1.44 mm, and the F-number thereof is 5.6.

The distance d along the optical axis between the negative lens L1, which is the closest to the object side, and the positive lens L2, which is disposed on the image side of the negative lens L1, is as small as 0.13 mm. The volume $V_1$ of an air layer between the negative lens L1 and the positive lens L2 is 0.055 mm³. The spherical segment volume $V_2$ of the negative lens L1, which is the closest to the object side, is as small as 0.036 mm³. Accordingly, the system has a structure that is not readily foggable.

Further, it is preferable that this example should satisfy the following conditions:

$$-1.5 < f1/f < -0.8. \tag{1}$$

$$-0.8 < R4/f < -0.4. \tag{2}$$

$$0.05 < d2/f < 0.3 \tag{3}$$

where:
  f1: the focal length of the first lens;
  f: the focal length of the entire system;

R4: the radius of curvature of the image-side surface of the second lens;

d2: the spacing between the first lens and the second lens.

The condition (1) ($-1.5<f1/f<-0.8$, f1: the focal length of the first lens; f: the focal length of the entire system) is a condition for minimizing the Petzval sum by suppressing an increase in the Petzval sum to thereby correct the curvature of field. By setting the negative power of the first lens relatively strong, a relatively large negative Petzval quantity is produced to prevent the Petzval sum of the entire system from increasing on the positive side. If f1/f is not larger than the lower limit of the condition (1), the negative power of the first lens becomes excessively weak. Consequently, the above-described advantageous effect cannot be obtained. If f1/f is not smaller than the upper limit, the negative power becomes excessively strong, causing spherical aberration and chromatic aberration to increase.

The condition (2) ($-0.8<R4/f<-0.4$, R4: the radius of curvature of the image-side surface of the second lens) is a condition necessary for the radius of curvature of the image-side surface of the second lens to satisfy in order to keep spherical aberration in an under-aberration state. In the lens of this example, the curvature of field will not become completely zero even if the condition (1) is satisfied. The balance between the axial performance and the off-axis performance, that is, the uniformity of image quality over the entire visual field, is determined by the amount of field curvature and the amount of spherical aberration. Even if the spherical aberration is made close to zero to improve the axial performance in a state where a field curvature is left, the image quality cannot be improved with good balance over the entire visual field. In this example, because a vitreous material having a relatively low refractive index is used for the positive lens, the Petzval sum becomes large, and the field curvature is likely to increase. Therefore, in order to improve the image quality with good balance over the entire visual field, it is necessary to produce some spherical aberration so as to keep the spherical aberration in an under-aberration state. The condition (2) is a condition for keeping the spherical aberration in an under-aberration state. If R4/f is not larger than the lower limit of the condition (2), the radius of curvature is excessively reduced, and the effect of keeping the spherical aberration in an under-aberration state is lost. As a result, the total spherical aberration in the lens becomes over-aberration. Thus, it becomes impossible to bring the axial performance into balance with the off-axis performance. If R4/f is not smaller than the upper limit, the radius of curvature is excessively increased, conversely, and the spherical aberration becomes excessively under-aberration.

The condition (3) ($0.05<d2/f<0.3$, d2: the spacing between the first lens and the second lens) is required for the spacing between the first lens and the second lens to keep the amount of spherical aberration appropriately, together with the condition (2). In this example, the negative power of the first lens is set relatively strong to minimize the Petzval sum, as has been stated above. Accordingly, the first lens produces various over-aberrations, particularly spherical over-aberration and chromatic over-aberration. These over-aberrations are canceled by under-aberrations produced by the second lens, which has a positive power. To make an appropriate cancellation, the spacing between the two lenses is required to satisfy the condition (3). If d2/f is not within the range defined by the condition (3), it is impossible to make an appropriate cancellation of aberrations as stated above. Consequently, spherical aberration, chromatic aberrations, etc. remain undesirably, causing the image quality to be degraded. The lower limit of the condition (3) is necessary also from the viewpoint of ensuring the physical spacing required between the first lens and the second lens.

EXAMPLE 6

Figure 8:
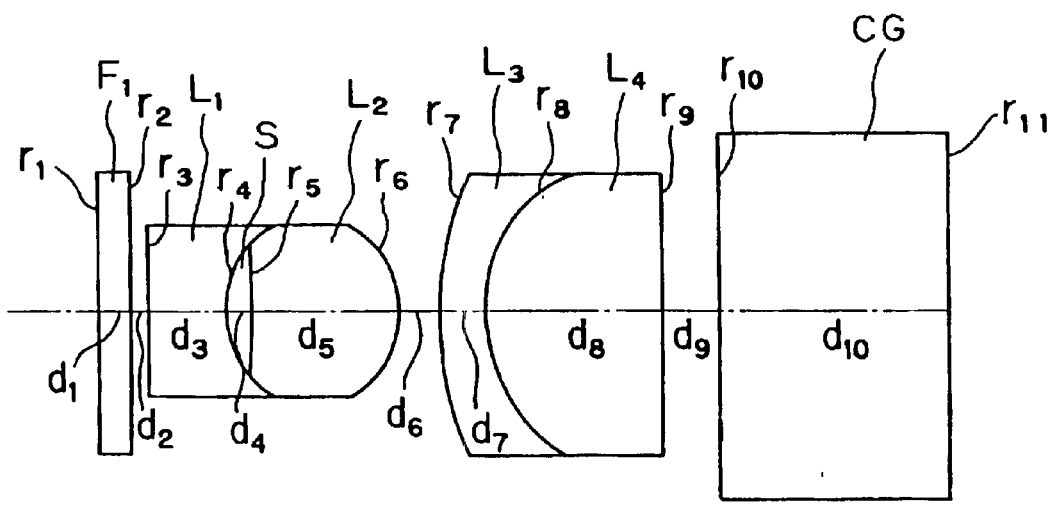
FIG. 8 is a sectional view of a lens system constituting an image pickup optical system according to Example 6.

FIG. 8 shows a sectional view of a lens system constituting an image pickup optical system according to Example 6. Example 6 has lens data as shown in Table 6, which will be shown later.

In Example 6, a cover glass F1 made of synthetic sapphire is disposed at the distal end of an image pickup optical system having a lens arrangement similar to that in Example 5. In the image pickup optical system, the spacing along the optical axis between a plano-concave negative lens L1 and a positive meniscus lens L2, which is disposed on the image side of the negative lens L1, is as narrow as 0.13 mm (<1 mm). Further, an aperture stop S is disposed between the negative lens L1 and the positive lens L2. With such an arrangement, it is possible to lower the maximum ray height on the negative lens L1 and the cover glass F1 of synthetic sapphire, which are disposed on the object side of the aperture stop S. Accordingly, the outer diameter of the cover glass F1 of synthetic sapphire can be reduced to a size not larger than 1.2 times the maximum size (e.g. diagonal dimension) of the effective image pickup surface of the solid-state image pickup device. The CCD used in this image pickup optical system is a monochromatic CCD, which is a high-density CCD with an average pixel pitch of 3 $\mu$m.

EXAMPLE 7

Figure 9:
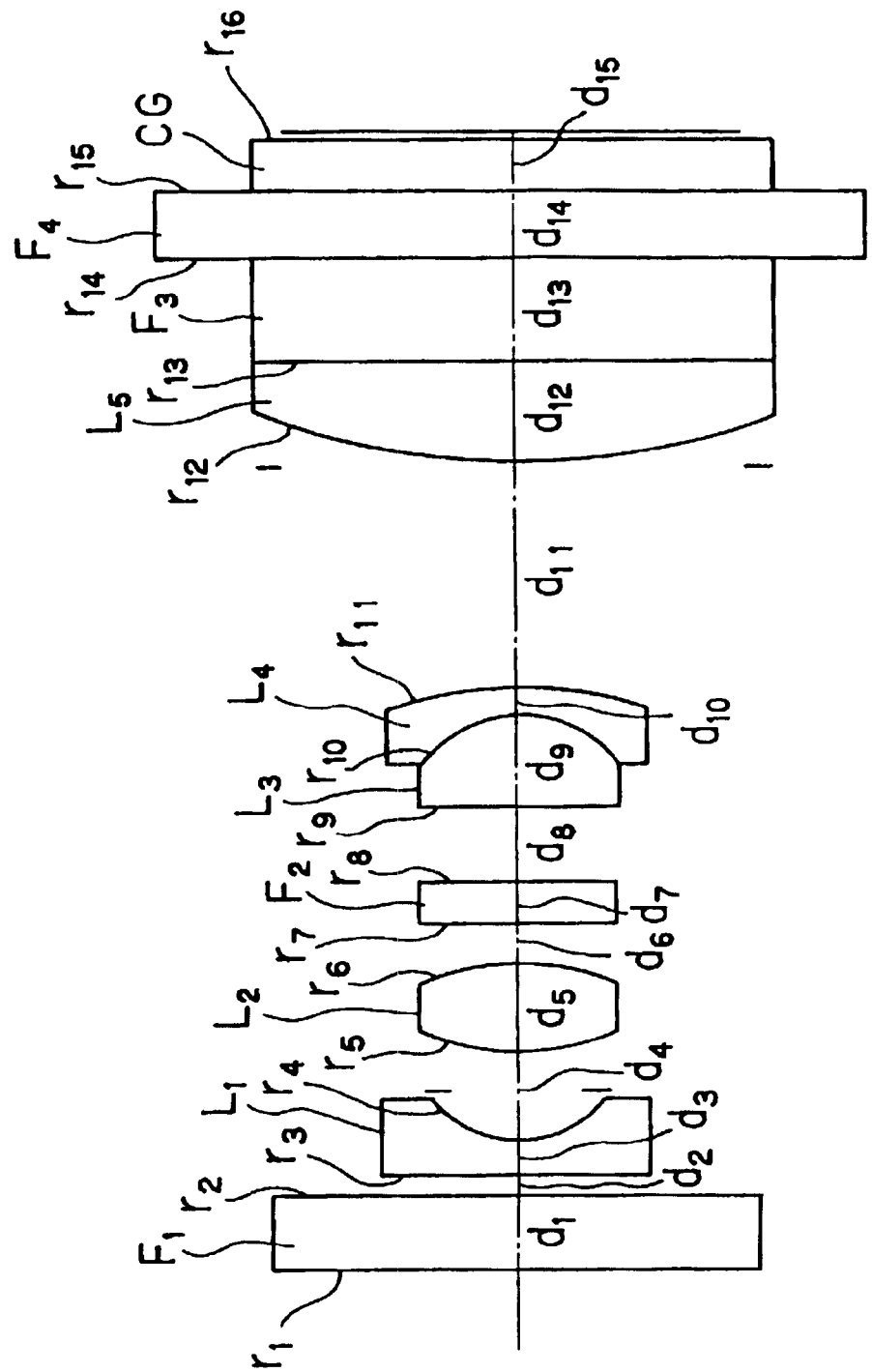
FIG. 9 is a sectional view of a lens system constituting an image pickup optical system according to Example 7.

FIG. 9 shows a sectional view of a lens system constituting an image pickup optical system according to Example 7. Example 7 has lens data as shown in Table 7, which will be shown later.

In Example 7, a cover glass F1 made of synthetic sapphire is disposed at the distal end of the image pickup optical system. The CCD used in this image pickup optical system is a color CCD employing an interline type complementary color filter, which is a high-density CCD with an average pixel pitch of 2.5 $\mu$m.

EXAMPLE 8

Figure 10:
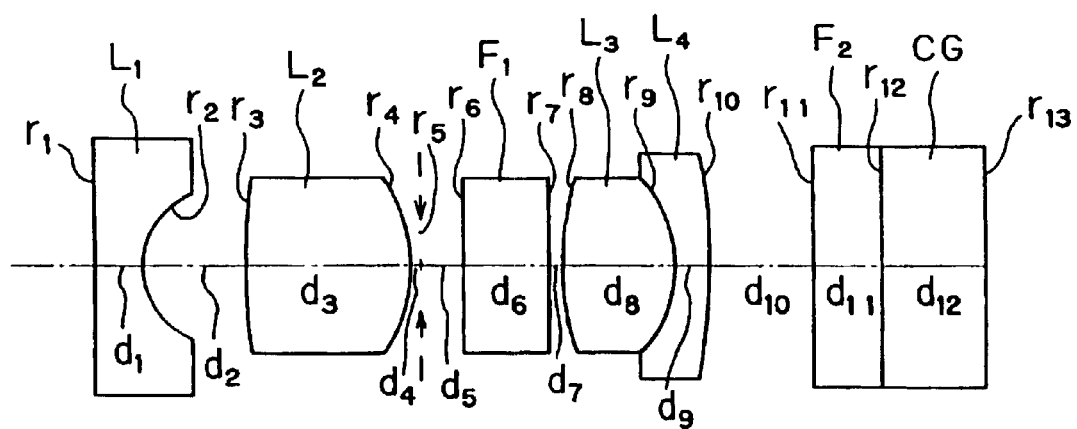
FIG. 10 is a sectional view of a lens system constituting an image pickup optical system according to Example 8.
Figure 11:
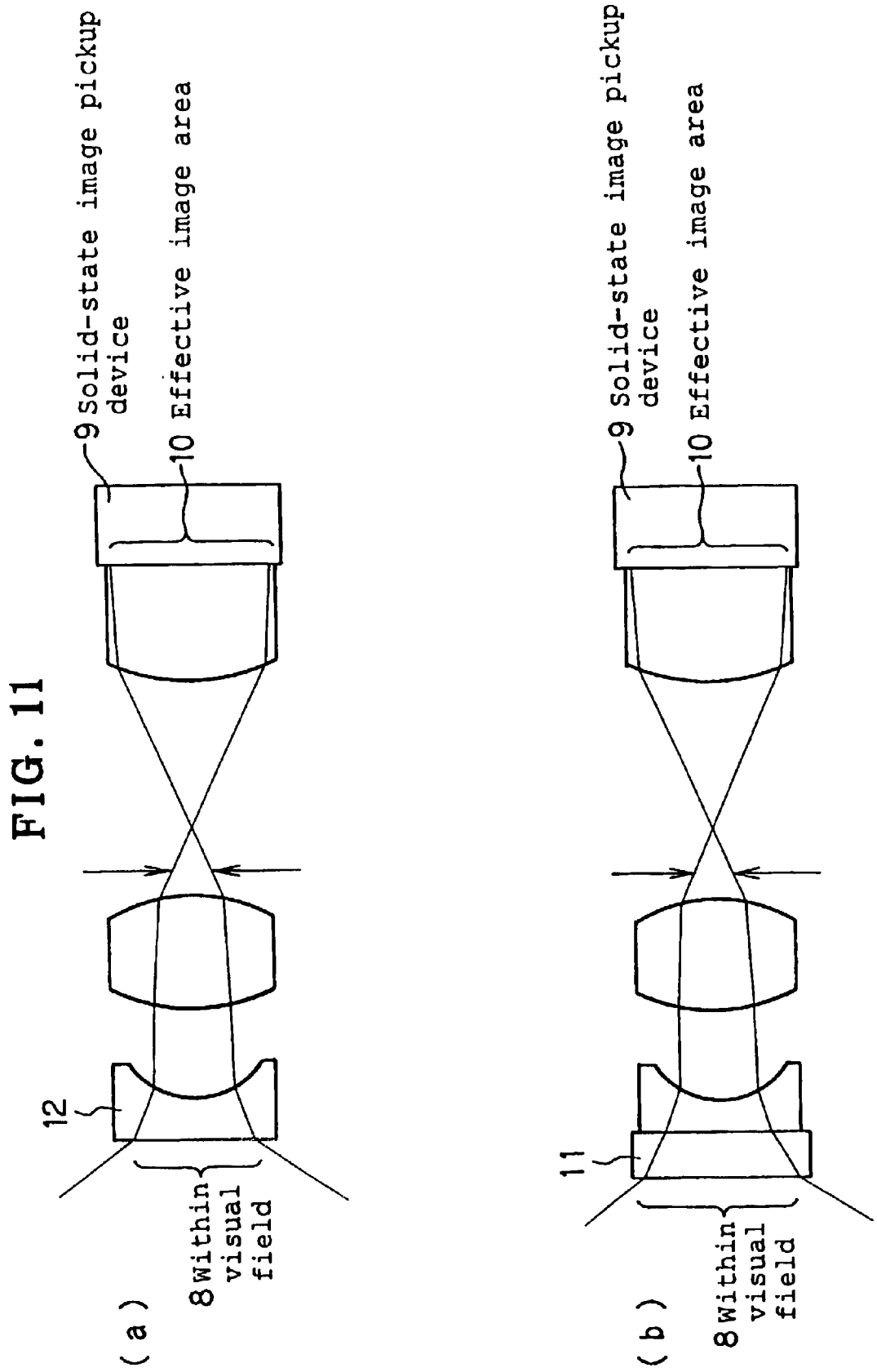
FIG. 11 is a diagram comparatively showing an objective optical system in the present invention in which the front optical element is a plano-concave lens and an objective optical system in which the front optical element is a plane-parallel plate.
Figure 12:
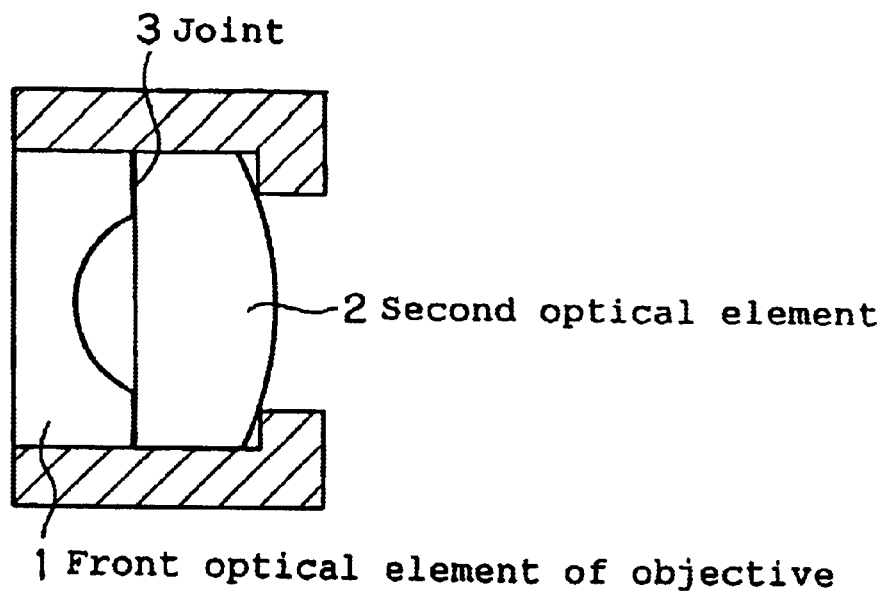
FIG. 12 is a diagram for describing a problem associated with a conventional endoscope objective optical system.

FIG. 10 shows a sectional view of a lens system constituting an endoscope optical system according to Example 8. Example 8 has lens data as shown in Table 8, which will be shown later.

Example 8 comprises, in order from the object side, a plano-concave negative lens L1, a double-convex positive lens L2, a filter F1 of plane-parallel plate for preventing infrared rays from entering the CCD, a cemented lens consisting of a double-convex positive lens L3 and a meniscus lens L4 having a convex surface directed toward the image side, a plane-parallel plate F2, and a cover glass CG for the CCD. It should be noted that the image-side plane surface of the plane-parallel plate F2 and the CCD cover glass CG are cemented together with an optical cement.

The CCD used in this image pickup optical system is a monochromatic CCD, which is a high-density CCD with an average pixel pitch of 4 $\mu$m.

The focal length of this image pickup optical system is 1.063 mm, and the F-number thereof is 3.6. The area of a light beam forming an image at a point of the maximum image height among the rays within the visual field is as small as 0.07 $mm^2$.

The volume of an air layer between the lens L1, which is the closest to the object side, and the double-concave positive lens L2 is 2.75 mm$^3$. Thus, the system has an antifogging structure.

The spherical segment volume $V_2$ is 0.39 mm$^3$. The distance d along the optical axis from the image side of the optical element L1, which is the closest to the object side, to the object-side surface of the second optical element F1, which is immediately subsequent to the optical element L1 toward the image side, is 0.934 mm.

At the viewing window of the image pickup optical system, the maximum ray height h of the rays within the visual field from the optical axis is 1.013 mm. The length φ from the center of the viewing window to the viewing window edge in the direction of the maximum ray height is 1.245 mm. Thus, the margin Y between the maximum ray height within the visual field and the edge of the viewing window is 0.232 mm. Therefore, the optical system has a structure free from image disturbance due to poor drainability.

Lens data concerning the optical systems according to the above-described Examples 1 to 8 will be shown below.

TABLE 1

$f = 7.316 \quad 2\omega = 42°$

| | | | | | | | |
|---|---|---|---|---|---|---|---|
| $r_1 =$ | 24 | $d_1 =$ | 1.6 | $n_{d1} =$ | 1.7692 | $v_{d1} =$ | 71.8 |
| $r_2 =$ | 5 | $d_2 =$ | 9.85 | | | | |
| $r_3 =$ | 7 | $d_3 =$ | 3.2 | $n_{d2} =$ | 1.43875 | $v_{d2} =$ | 94.99 |
| $r_4 =$ | −11 | $d_4 =$ | 0.33 | | | | |
| $r_5 =$ | 7 | $d_5 =$ | 3.006 | $n_{d3} =$ | 1.51633 | $v_{d3} =$ | 64.14 |
| $r_6 =$ | −14 | $d_6 =$ | 1.988 | $n_{d4} =$ | 1.883 | $v_{d4} =$ | 40.76 |
| $r_7 =$ | 16 | $d_7 =$ | 1.2 | | | | |
| $r_8 =$ | ∞ | $d_8 =$ | 0.913 | $n_{d5} =$ | 1.744 | $v_{d5} =$ | 44.78 |
| $r_9 =$ | ∞ | $d_9 =$ | 1.615 | $n_{d6} =$ | 1.51633 | $v_{d6} =$ | 64.14 |
| $r_{10} =$ | ∞ | $d_{10} =$ | 1.254 | $n_{d7} =$ | 1.744 | $v_{d7} =$ | 44.78 |
| $r_{11} =$ | ∞ | $d_{11} =$ | 0.926 | $n_{d8} =$ | 1.744 | $v_{d8} =$ | 44.78 |
| $r_{12} =$ | ∞ | $d_{12} =$ | 0.5 | | | | |
| $r_{13} =$ | ∞ | $d_{13} =$ | 0.7 | $n_{d9} =$ | 1.51633 | $v_{d9} =$ | 64.14 |
| $r_{14} =$ | ∞ | $d_{14} =$ | 3.5 | | | | |

TABLE 2

$f = 1.8 \quad 2\omega = 100°$

| | | | | | | | |
|---|---|---|---|---|---|---|---|
| $r_1 =$ | ∞ | $d_1 =$ | 0.3 | $n_{d1} =$ | 1.8300 | | |
| $r_2 =$ | ∞ | $d_2 =$ | 0.1 | | | | |
| $r_3 =$ | ∞ | $d_3 =$ | 0.4 | $n_{d2} =$ | 1.8830 | $v_{d2} =$ | 40.76 |
| $r_4 =$ | 1 | $d_4 =$ | 0.77 | | | | |
| $r_5 =$ | 1.9 | $d_5 =$ | 1.6 | $n_{d3} =$ | 1.699 | $v_{d3} =$ | 30.13 |
| $r_6 =$ | −1.97 | $d_6 =$ | 0.23 | | | | |
| $r_7 =$ | ∞ | $d_7 =$ | 1.6 | $n_{d4} =$ | 1.514 | $v_{d4} =$ | 75 |
| $r_8 =$ | ∞ | $d_8 =$ | 1.84 | | | | |
| $r_9 =$ | 4 | $d_9 =$ | 1.74 | $n_{d5} =$ | 1.8830 | $v_{d5} =$ | 40.76 |
| $r_{10} =$ | ∞ | $d_{10} =$ | 0.4 | $n_{d6} =$ | 1.6127 | $v_{d6} =$ | 58.72 |

TABLE 3

$f = 1.539 \quad 2\omega = 119°$

| | | | | | | | |
|---|---|---|---|---|---|---|---|
| $r_1 =$ | ∞ | $d_1 =$ | 0.4 | $n_{d1} =$ | 1.7692 | $v_{d1} =$ | 71.8 |
| $r_2 =$ | 1 | $d_2 =$ | 0.6 | | | | |
| $r_3 =$ | ∞ | $d_3 =$ | 0.4 | $n_{d2} =$ | 1.51633 | $v_{d2} =$ | 64.14 |
| $r_4 =$ | ∞ | $d_4 =$ | 0.14 | | | | |
| $r_5 =$ | 2.1 | $d_5 =$ | 1.3 | $n_{d3} =$ | 1.69895 | $v_{d3} =$ | 30.13 |
| $r_6 =$ | −2.1 | $d_6 =$ | 0.33 | | | | |
| $r_7 =$ | ∞ | $d_7 =$ | 1.6 | $n_{d4} =$ | 1.514 | $v_{d4} =$ | 75 |
| $r_8 =$ | ∞ | $d_8 =$ | 1.32 | | | | |

TABLE 3-continued $f = 1.539 \quad 2\omega = 119°$

| | | | | | | | |
|---|---|---|---|---|---|---|---|
| $r_9 =$ | 3.072 | $d_9 =$ | 1.68 | $n_{d5} =$ | 1.8830 | $v_{d5} =$ | 40.76 |
| $r_{10} =$ | ∞ | $d_{10} =$ | 0.4 | $n_{d6} =$ | 1.61272 | $v_{d6} =$ | 58.72 |

TABLE 4

$f = 0.6629 \quad 2\omega = 146°$

| | | | | | | | |
|---|---|---|---|---|---|---|---|
| $r_1 =$ | ∞ | $d_1 =$ | 0.19 | $n_{d1} =$ | 1.7692 | $v_{d1} =$ | 71.8 |
| $r_2 =$ | 0.47 | $d_2 =$ | 0.284 | | | | |
| $r_3 =$ | ∞ | $d_3 =$ | 0.19 | $n_{d2} =$ | 1.51633 | $v_{d2} =$ | 64.14 |
| $r_4 =$ | ∞ | $d_4 =$ | 0.07 | | | | |
| $r_5 =$ | 0.98 | $d_5 =$ | 0.7 | $n_{d3} =$ | 1.69895 | $v_{d3} =$ | 30.13 |
| $r_6 =$ | −0.98 | $d_6 =$ | 0.15 | | | | |
| $r_7 =$ | ∞ | $d_7 =$ | 0.75 | $n_{d4} =$ | 1.514 | $v_{d4} =$ | 75 |
| $r_8 =$ | ∞ | $d_8 =$ | 0.475 | | | | |
| $r_9 =$ | 1.43 | $d_9 =$ | 0.78 | $n_{d5} =$ | 1.8830 | $v_{d5} =$ | 40.76 |
| $r_{10} =$ | ∞ | $d_{10} =$ | 0.2 | $n_{d6} =$ | 1.61272 | $v_{d6} =$ | 58.72 |

TABLE 5

$f = 1.44 \quad FNo = 5.6$

| | | | | | | | |
|---|---|---|---|---|---|---|---|
| $r_1 =$ | ∞ | $d_1 =$ | 0.6651 | $n_{d1} =$ | 1.76920 | $v_{d1} =$ | 71.90 |
| $r_2 =$ | 1.2737 | $d_2 =$ | 0.1300 | | | | |
| $r_3 =$ | −5.0760 | $d_3 =$ | 0.9900 | $n_{d2} =$ | 1.49700 | $v_{d2} =$ | 81.54 |
| $r_4 =$ | −0.7280 | $d_4 =$ | 0.2300 | | | | |
| $r_5 =$ | 2.6010 | $d_5 =$ | 0.3000 | $n_{d3} =$ | 1.84666 | $v_{d3} =$ | 23.78 |
| $r_6 =$ | 1.1900 | $d_6 =$ | 1.1700 | $n_{d4} =$ | 1.72916 | $v_{d4} =$ | 54.68 |
| $r_7 =$ | ∞ | $d_7 =$ | 0.3800 | | | | |
| $r_8 =$ | ∞ | $d_8 =$ | 1.5000 | $n_{d5} =$ | 1.51633 | $v_{d5} =$ | 64.14 |
| $r_9 =$ | ∞ | | | | | | |

TABLE 6

$f = 1.443 \quad FNo = 5.6$

| | | | | | | | |
|---|---|---|---|---|---|---|---|
| $r_1 =$ | ∞ | $d_1 =$ | 0.2000 | $n_{d1} =$ | 1.76920 | $v_{d1} =$ | 71.90 |
| $r_2 =$ | ∞ | $d_2 =$ | 0.1000 | | | | |
| $r_3 =$ | ∞ | $d_3 =$ | 0.5700 | $n_{d2} =$ | 1.51633 | $v_{d2} =$ | 64.14 |
| $r_4 =$ | 0.8550 | $d_4 =$ | 0.1300 | | | | |
| $r_5 =$ | −5.0760 | $d_5 =$ | 0.9900 | $n_{d3} =$ | 1.49700 | $v_{d3} =$ | 81.54 |
| $r_6 =$ | −0.7280 | $d_6 =$ | 0.2300 | | | | |
| $r_7 =$ | 2.6010 | $d_7 =$ | 0.3000 | $n_{d4} =$ | 1.84666 | $v_{d4} =$ | 23.78 |
| $r_8 =$ | 1.1900 | $d_8 =$ | 1.1700 | $n_{d5} =$ | 1.72916 | $v_{d5} =$ | 54.68 |
| $r_9 =$ | ∞ | $d_9 =$ | 0.3800 | | | | |
| $r_{10} =$ | ∞ | $d_{10} =$ | 1.5000 | $n_{d6} =$ | 1.51633 | $v_{d6} =$ | 64.14 |
| $r_{11} =$ | ∞ | | | | | | |

TABLE 7

$f = 2.738 \quad FNo = 8.038$

| | | | | | | | |
|---|---|---|---|---|---|---|---|
| $r_1 =$ | ∞ | $d_1 =$ | 0.7000 | $n_{d1} =$ | 1.76920 | $v_{d1} =$ | 71.79 |
| $r_2 =$ | ∞ | $d_2 =$ | 0.2000 | | | | |
| $r_3 =$ | ∞ | $d_3 =$ | 0.4000 | $n_{d2} =$ | 1.88300 | $v_{d2} =$ | 40.76 |
| $r_4 =$ | 1.0730 | $d_4 =$ | 0.8400 | | | | |
| $r_5 =$ | 2.4060 | $d_5 =$ | 0.8400 | $n_{d3} =$ | 1.77250 | $v_{d3} =$ | 49.60 |
| $r_6 =$ | −2.4060 | $d_6 =$ | 0.3800 | | | | |
| $r_7 =$ | ∞ | $d_7 =$ | 0.4000 | $n_{d4} =$ | 1.52287 | $v_{d4} =$ | 59.89 |
| $r_8 =$ | ∞ | $d_8 =$ | 0.7600 | | | | |
| $r_9 =$ | ∞ | $d_9 =$ | 0.9300 | $n_{d5} =$ | 1.51633 | $v_{d5} =$ | 64.14 |
| $r_{10} =$ | −1.0730 | $d_{10} =$ | 0.3000 | $n_{d6} =$ | 1.84666 | $v_{d6} =$ | 23.78 |
| $r_{11} =$ | −3.1270 | $d_{11} =$ | 2.1700 | | | | |
| $r_{12} =$ | 5.6250 | $d_{12} =$ | 1.0000 | $n_{d7} =$ | 1.88300 | $v_{d7} =$ | 40.76 |
| $r_{13} =$ | ∞ | $d_{13} =$ | 1.0000 | $n_{d8} =$ | 1.49400 | $v_{d8} =$ | 75.00 |
| $r_{14} =$ | ∞ | $d_{14} =$ | 0.7000 | $n_{d9} =$ | 1.76820 | $v_{d9} =$ | 71.79 |

TABLE 7-continued

| | | | | f = 2.738 | | FNo = 8.038 | | |
|---|---|---|---|---|---|---|---|---|
| $r_{15} =$ | ∞ | $d_{15} =$ | 0.5000 | $n_{d10} =$ | 1.48749 | $v_{d10} =$ | 70.21 |
| $r_{16} =$ | ∞ | | | | | | |

TABLE 8

| | | | | f = 1.063 | | 2ω = 131° | | |
|---|---|---|---|---|---|---|---|---|
| $r_1 =$ | ∞ | $d_1 =$ | 0.4483 | $n_{d1} =$ | 1.88300 | $v_{d1} =$ | 40.78 |
| $r_2 =$ | 0.7634 | $d_2 =$ | 0.9340 | | | | |
| $r_3 =$ | 7.0411 | $d_3 =$ | 1.4944 | $n_{d2} =$ | 1.71300 | $v_{d2} =$ | 53.84 |
| $r_4 =$ | −1.5841 | $d_4 =$ | 0.0872 | | | | |
| $r_5 =$ | ∞ | $d_5 =$ | 0.3645 | | | | |
| $r_6 =$ | ∞ | $d_6 =$ | 0.7721 | $n_{d3} =$ | 1.51400 | $v_{d3} =$ | 75.00 |
| $r_7 =$ | ∞ | $d_7 =$ | 0.1245 | | | | |
| $r_8 =$ | 3.0374 | $d_8 =$ | 1.0336 | $n_{d4} =$ | 1.69680 | $v_{d4} =$ | 55.53 |
| $r_9 =$ | −1.3163 | $d_9 =$ | 0.3238 | $n_{d5} =$ | 1.84666 | $v_{d5} =$ | 23.78 |
| $r_{10} =$ | −6.8892 | $d_{10} =$ | 0.9373 | | | | |
| $r_{11} =$ | ∞ | $d_{11} =$ | 0.6227 | $n_{d6} =$ | 1.51633 | $v_{d6} =$ | 64.15 |
| $r_{12} =$ | ∞ | $d_{12} =$ | 0.9340 | $n_{d7} =$ | 1.53172 | $v_{d7} =$ | 48.91 |
| $r_{13} =$ | ∞ | | | | | | |

It should be noted that as optical materials having a Knoop hardness of not less than 800, spinel, YAG (yttrium aluminium garnet), ALON (aluminium oxynitride), etc. may also be used besides sapphire and titanium dioxide, mentioned in the foregoing examples.

Figure 14:
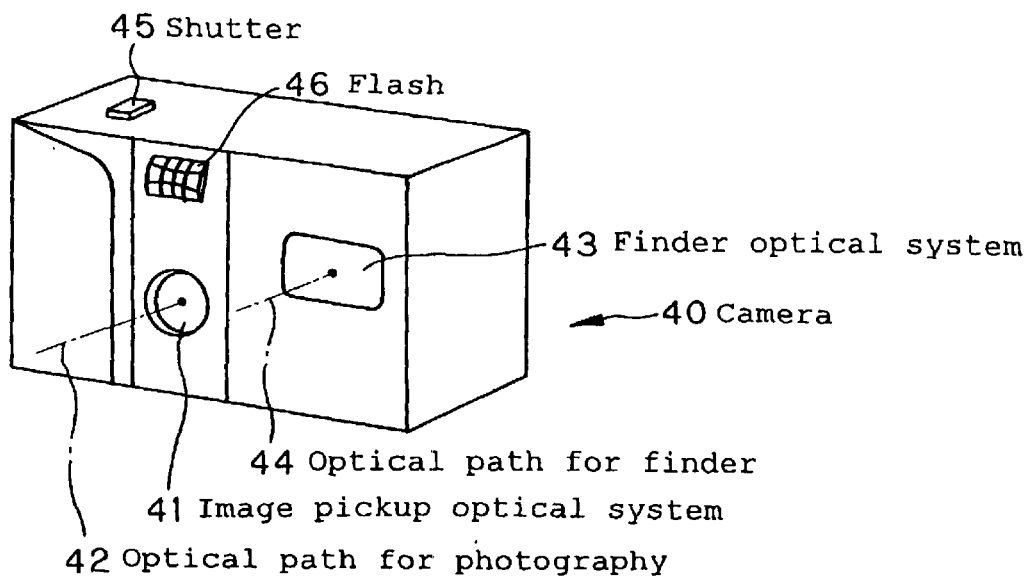
FIG. 14 is a perspective view showing the external appearance of an electronic camera to which an image pickup optical system according to the present invention is applied, as viewed from the front side thereof.
Figure 15:
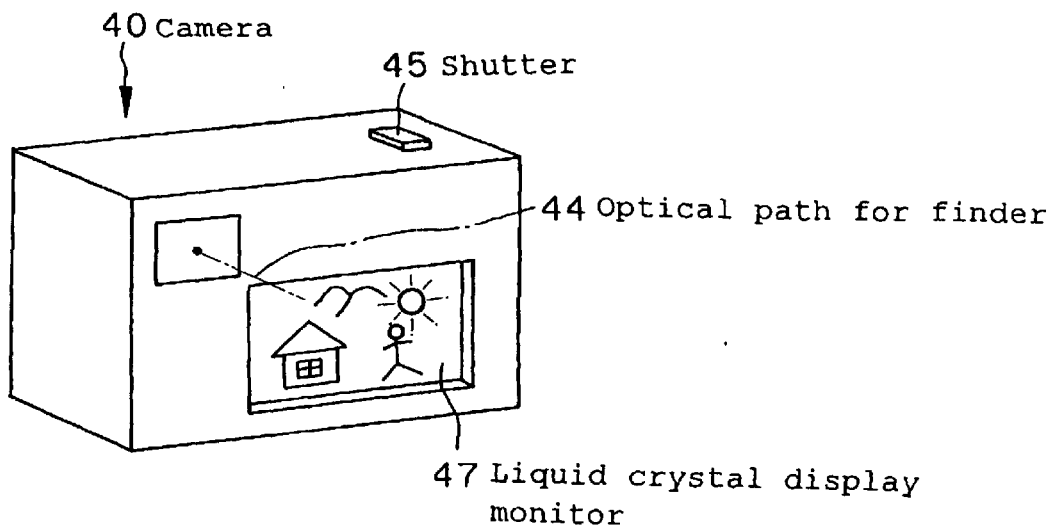
FIG. 15 is a perspective view of the electronic camera shown in FIG. 14, as viewed from the rear side thereof.
Figure 16:
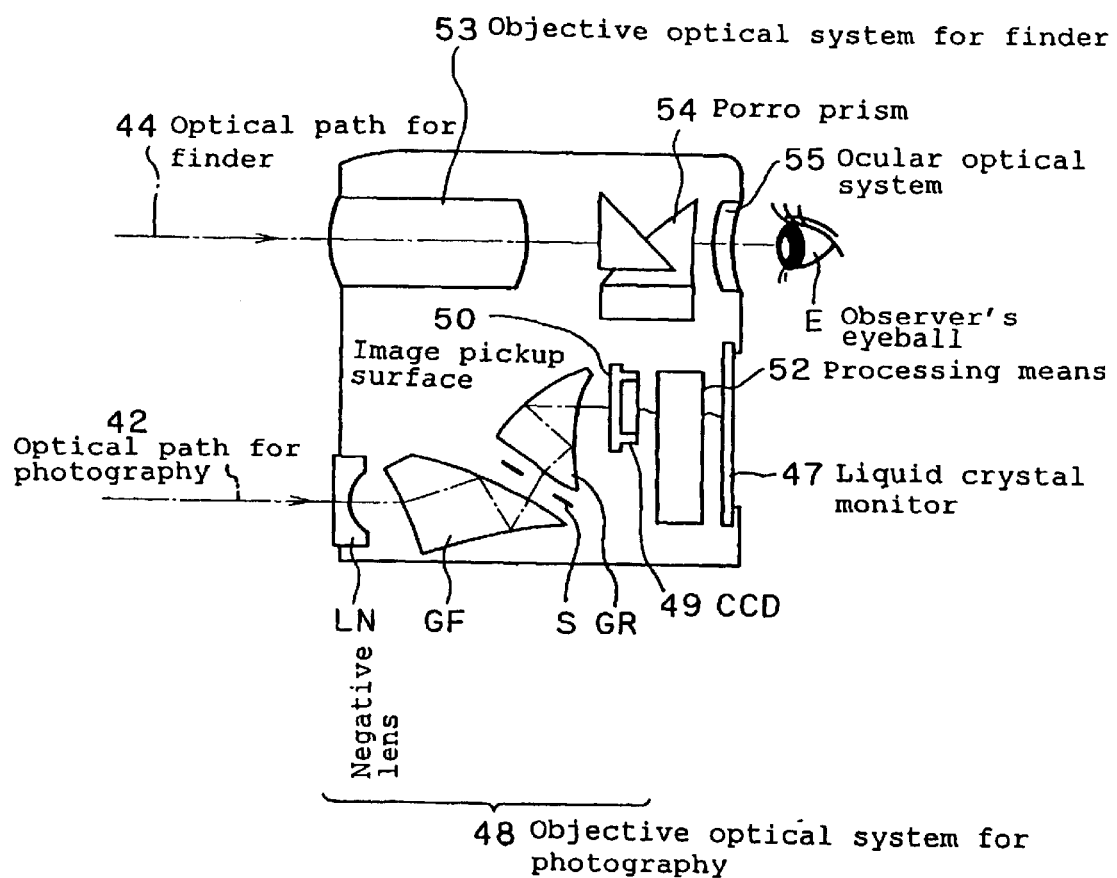
FIG. 16 is a sectional view showing the arrangement of the electronic camera in FIG. 14.

FIGS. 14 to 16 are conceptual views showing an arrangement in which an image pickup optical system according to the present invention is used as a photographic optical system 41 of an electronic camera. FIG. 14 is a perspective view showing the external appearance of an electronic camera 40 as viewed from the front side thereof. FIG. 15 is a perspective view of the electronic camera 40 as viewed from the rear side thereof. FIG. 16 is a sectional view showing the arrangement of the electronic camera 40. In this example, the electronic camera 40 includes a photographic optical system 41 having an optical path 42 for photography, a finder optical system 43 having an optical path 44 for a finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter, e.g. a low-pass filter, an infrared cutoff filter, etc. The object image received by the CCD 49 is processed in a processing means 52 and displayed as an electronic image on the liquid crystal display monitor 47, which is provided on the rear of the camera 40. A memory or the like may be installed in the processing means 52 to enable the photographed electronic image to be recorded. It should be noted that the memory may be provided separately from the processing means 52. The arrangement may also be such that the photographed electronic image is electronically recorded or written on a floppy disk or the like. The camera 40 may be arranged in the form of a silver halide camera in which a silver halide film is disposed in place of the CCD 49.

In the optical path 44 for the finder, an objective optical system 53 for the finder is disposed, together with a Porro prism 54 for erecting an object image formed by the objective optical system 53 for the finder and an ocular optical system 55, thereby allowing an observer's eyeball E to observe an erect image of the subject.

In this example, the objective optical system 48 for photography comprises a negative lens LN serving also as a cover glass, a front group GF formed from a decentered prism and using rotationally asymmetric surfaces, e.g. free-form surfaces and anamorphic surfaces, as refracting surfaces and reflecting surfaces constituting the prism, an aperture stop S, and a rear group GR formed from a decentered prism and using rotationally asymmetric surfaces, e.g. free-form surfaces and anamorphic surfaces, as refracting surfaces and reflecting surfaces constituting the prism as in the case of the front group GF. The decentered prism forming the front group GF has three surfaces. The first surface is an entrance refracting surface. The second surface is a curved surface serving as both an exit refracting surface and an internally totally reflecting surface. The third surface is an internally reflecting surface. The decentered prism forming the rear group GR also has three surfaces. The first surface is an entrance refracting surface. The second surface is a curved surface serving as both an exit refracting surface and an internally totally reflecting surface. The third surface is an internally reflecting surface.

The negative lens LN in the objective optical system 48 for photography uses a material having a Knoop hardness of not less than 800, e.g. synthetic sapphire, according to the present invention. In addition, an interline type high-density color CCD having an average pixel pitch (H+V)/2 of not more than 3.1 μm is used as the CCD 49.

INDUSTRIAL APPLICABILITY

As will be clear from the foregoing description, the endoscope optical system according to the present invention is free from image quality disturbance due to a scratch, chip, drops of water formed by condensation, drops of washing water, etc., and hence capable of obtaining favorable and high-quality endoscopic images at all times.

What is claimed is:

1. An endoscope image pickup optical system in an image pickup apparatus using a monochromatic high-density solid-state image pickup device in which an average pixel pitch (H+V)/2 of a pixel pitch H in a horizontal direction and a pixer pitch V in a vertical direction with respect to a monitor scanning line is not more than 4.65 μm, or using an interline type color high-density solid-state image pickup device in which an average pixel pitch (H+V)/2 is not more than 3.1 μm, wherein a volume $V_1$ of an air layer between an optical element closest to an object side in the image pickup optical system and a second optical element immediately subsequent to said optical element toward an image side satisfies the following condition:

$$V_1 < 4 \text{ mm}^3 \quad (1).$$

2. An endoscope image pickup optical system according to claim 1, wherein a distance d along an optical axis from an image-side surface of the optical element closest to the object side in the image pickup optical system to an object-side surface of the second optical element immediately subsequent to said optical element toward the image side satisfies the following condition:

$$d < 1 \text{ mm} \quad (2)$$

and when the optical element closest to the object side in the image pickup optical system is a lens having a concave surface directed toward the image side or a plano-concave lens cemented to a plane-parallel plate, a volume $V_2$ of an approximately spherically cut portion (hereinafter referred to as "spherical segment volume") on a concave surface side of the lens satisfies the following condition:

$$V_2 < 1.5 \text{ mm}^3 \qquad (3).$$

3. An endoscope image pickup optical system according to claim 2, wherein a foremost optical element is a negative lens having, in order from an object side thereof, a plane surface and a concave surface directed toward the image side.

4. An endoscope image pickup optical system according to claim 3, wherein a focal length of the image pickup optical system is not more than 2.2 mm.

5. An endoscope image pickup optical system according to claim 3, wherein an F-number of the image pickup optical system is not less than 3.5.

6. An endoscope image pickup optical system according to claim 2, wherein a focal length of the image pickup optical system is not more than 2.2 mm.

7. An endoscope image pickup optical system according to claim 2, wherein an F-number of the image pickup optical system is not less than 3.5.

8. An endoscope image pickup optical system according to claim 1, wherein a focal length of the image pickup optical system is not more than 2.2 mm.

9. An endoscope image pickup optical system according to claim 1, wherein an F-number of the image pickup optical system is not less than 3.5.

10. An endoscope image pickup optical system in an image pickup apparatus using a monochromatic high-density solid-state image pickup device in which an average pixel pitch (H+V)/2 of a pixel pitch H in a horizontal direction and a pixel pitch V in a vertical direction with respect to a monitor scanning line is not more than 4.65 μm, or using an interline type color high-density solid-state image pickup device in which an average pixel pitch (H+V)/2 is not more than 3.1 μm, wherein when a length from a center of a viewing window to an edge thereof on an object-side surface of an optical element closest to an object side in the image pickup optical system is denoted by φ and a maximum ray height of rays within a visual field on the object-side surface of said optical element from an optical axis of an objective optical system is denoted by h, a minimum margin Y(=φ−h) for the length to the edge of the objective window with respect to the ray height satisfies the following conditions:

$$1.0 \text{ mm} < \phi < 3.5 \text{ mm} \qquad (4)$$

$$0.12 \text{ mm} < Y < 0.6 \text{ mm} \qquad (5).$$

11. An endoscope image pickup optical system according to claim 10, wherein a focal length of the image pickup optical system is not more than 2.2 mm.

12. An endoscope objective optical system according to claim 10, wherein an F-number of the image pickup optical system is not less than 3.5.

13. An image pickup optical system in an image pickup apparatus using a monochromatic high-density solid-state image pickup device in which an average pixel pitch (H+V)/2 of a pixel pitch H in a horizontal direction and a pixel pitch V in a vertical direction with respect to a monitor scanning line is not more than 6 μm, or using a color high-density sold-state image pickup device in which an average pixel pitch (H+V)/2 is not more than 3 μm, wherein an optical element closest to an object side in the image pickup optical system uses a material having a Knoop hardness of not less than 800.

14. An image pickup optical system according to claim 13, wherein a focal length of the image pickup optical system is not more than 2.2 mm.

15. An image pickup optical system according to claim 14, wherein a foremost optical element is a negative lens having, in order from an object side thereof, a plane surface and a concave surface directed toward an image side thereof.

16. An image pickup optical system according to claim 15, wherein a material of the optical element closest to the object side is sapphire.

17. An image pickup optical system according to claim 14, wherein a material of the optical element closest to the object side is sapphire.

18. An objective optical system according to claim 13, wherein an F-number of the image pickup optical system is not less than 3.5.

19. An image pickup optical system according to claim 18, wherein a foremost optical element is a negative lens having, in order from an object side thereof, a plane surface and a concave surface directed toward an image side thereof.

20. An image pickup optical system according to claim 19, wherein a material of the optical element closest to the object side is sapphire.

21. An image pickup optical system according to claim 18, wherein a material of the optical element closest to the object side is sapphire.

22. An image pickup optical system according to claim 13, wherein a material of the optical element closest to the object side is sapphire.

* * * * *